(No Model.)
A. SOMMER.
PROCESS OF REMOVING FREE HYDROCHLORIC ACID FROM SULPHO CHLORIDES.
No. 463,875. Patented Nov. 24, 1891.
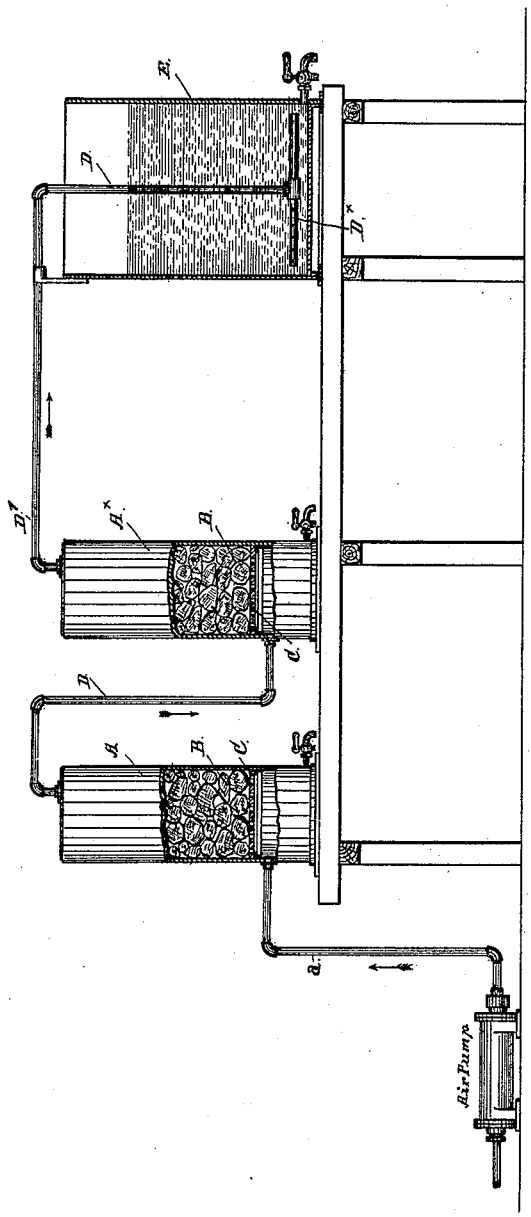
Witnesses:
Inventor:
Adolph Sommer

UNITED STATES PATENT OFFICE.

ADOLPH SOMMER, OF BERKELEY, CALIFORNIA.

PROCESS OF REMOVING FREE HYDROCHLORIC ACID FROM SULPHO-CHLORIDES.

SPECIFICATION forming part of Letters Patent No. 463,875, dated November 24, 1891.

Application filed September 3, 1890. Serial No. 363,838. (No specimens.) Patented in Germany September 5, 1888, No. 50,282.

*To all whom it may concern:*

Be it known that I, ADOLPH SOMMER, a citizen of the United States, and a resident of Berkeley, in the county of Alameda and State of California, have invented a new and useful Process of Removing the Free Hydrochloric Acid from Sulpho-Chlorides, (forming a part of Letters Patent received by me in Germany, numbered 50,282, and dated September 5, 1888;) and I do hereby declare that the following is an exact description of the invention, which will enable others skilled in chemical manipulations to carry out the same process.

In the reaction between chloride of sulphur and fatty bodies there is always formed a small quantity of acid, principally chlorhydric, that must be removed in order to make the sulphochlorinated compounds stable and to render them applicable to technical uses. The removal of the acid is generally accomplished by incorporating with the compound considerable quantities of neutralizing agents, such as air-slaked lime, crystallized carbonate of soda, oil of turpentine; but in many preparations—as, for instance, in lubricants and paint-oils—the presence of large proportions of such neutralizing substances or of the products resulting from them is objectionable, while their complete removal is attended with an expenditure of much time and labor. Now I have found that these neutralizing agents can in some cases be greatly reduced in quantity, in other cases entirely dispensed with, if dry air is passed through the acid preparation. So long as no moisture is allowed to come in contact with the acid preparation the acids are, if not in the gaseous state, at least so loosely combined with the sulpho-chlorides that they are quite volatile; but as soon as moisture is introduced into the compounds the acids combine at once therewith and form hydrates, which are but sparingly volatile, and which, owing to the great viscosity of the sulpho-chlorides, are so tenaciously held in suspension that they never settle to the bottom. The difference in the degree of volatility, owing to the absence or presence of moisture, is strikingly shown by chlorhydric acid, the predominating acid in the freshly-prepared sulpho-chlorides. This acid is, as is well known, a gas at all ordinary temperatures and atmospheric pressures; but as soon as it is brought in contact with water it forms a liquid hydrate that boils much above the boiling-point of water—namely, at 110° centigrade. It is therefore all important that the air which is to be used for removing the acids from the compounds be freed completely from moisture before it is brought in contact with the compounds, lest the acids be fixed by the water contained in the air and their removal by air rendered practically impossible.

To accomplish the drying of the air various methods may be resorted to; but on account of the simplicity of the arrangement I generally prefer to force the air by means of an air-pump through one or more upright cylinders filled with calcium chloride and so arranged that the solution of calcium chloride which is formed during the operation can drain off. Forcing the air through strong sulphuric acid or through cylinders filled with pumice, over which strong sulphuric acid is kept trickling, I find equally effective, but generally less convenient.

An apparatus used in the treatment of fluid-sulphochlorinated preparations is illustrated in the accompanying drawing. On the left-hand side is shown an air-pump. A and $A^\times$ represent cylinders, which are filled with pieces of calcium chloride, (marked B,) and which are provided with a false bottom, (shown at C,) below which collects the liquefied (dissolved) calcium chloride. Vessel E holds the acid preparation. When the air-pump is set in motion, the air is forced through pipe $a$ into the first one of the chloride-of-calcium cylinders, thence through pipe D into the second cylinder, and thence through pipe D' and its perforated branch $D^\times$ into the acid preparation. The numerous fine streams of air issuing from the perforations of pipe $D^\times$ pass through the acid preparation and in doing so carry off the volatile acids. The operation is continued until these acids are no longer perceptible in the air escaping from the preparation. According to the efficiency of the device used for distributing the air or the completeness of neutralization desired, the operation may last from six to forty-eight hours.

Instead of removing the acid completely by this process, which would in some cases take too long a time, it is often preferable to remove in this manner only the largest part of it, and then to add a small quantity of some neutralizing agent to complete the neutralization.

Having thus described my invention, what I claim, and desire to secure by Letters Patent of the United States, is—

The process of removing the free chlorhydric acid from sulpho-chlorides, which consists in passing through them air that has been deprived of its moisture, substantially as described.

ADOLPH SOMMER.

Witnesses:
JOHN H. GRAY, Jr.,
JOSEPH LeCONTE.